(12) United States Patent
Chupka (10) Patent No.: US 10,570,550 B2
(45) Date of Patent: Feb. 25, 2020

(54) WASHING MACHINE APPLIANCE AND SHIFTER ASSEMBLY THEREFOR

(71) Applicant: Haier US Appliance Solutions, Inc., Wilmington, DE (US)

(72) Inventor: Edward Simeon Chupka, Bardstown, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 241 days.

(21) Appl. No.: 15/437,477

(22) Filed: Feb. 21, 2017

(65) Prior Publication Data

US 2018/0237975 A1    Aug. 23, 2018

(51) Int. Cl.

| D06F 37/40 | (2006.01) |
|---|---|
| D06F 17/08 | (2006.01) |
| D06F 39/00 | (2020.01) |
| D06F 33/02 | (2006.01) |
| D06F 23/04 | (2006.01) |
| F16D 11/14 | (2006.01) |
| D06F 37/30 | (2020.01) |

(52) U.S. Cl.
CPC .............. *D06F 37/40* (2013.01); *D06F 17/08* (2013.01); *D06F 33/02* (2013.01); *D06F 39/005* (2013.01); *D06F 23/04* (2013.01); *D06F 37/304* (2013.01); *D06F 2212/02* (2013.01); *F16D 11/14* (2013.01)

(58) Field of Classification Search
CPC ........ D06F 37/40; D06F 39/005; D06F 33/02; D06F 37/304; D06F 23/04; D06F 2212/02; F16D 11/14
See application file for complete search history.

(56) References Cited

U.S. PATENT DOCUMENTS

| 3,194,032 | A | * | 7/1965 | Von Brimer | .......... | D06F 37/304 |
| | | | | | | 310/13 |
| 3,355,914 | A | * | 12/1967 | Venema | ............... | H02K 41/025 |
| | | | | | | 310/268 |
| 5,576,620 | A | * | 11/1996 | Cheong | ................. | D06F 37/304 |
| | | | | | | 324/174 |
| 5,586,455 | A | * | 12/1996 | Imai | ........................ | D06F 37/40 |
| | | | | | | 68/12.02 |
| 8,950,221 | B2 | | 2/2015 | Chupka et al. | | |
| 9,328,445 | B2 | | 5/2016 | Chupka et al. | | |
| 2001/0011879 | A1 | * | 8/2001 | Erdman | .................. | H02P 27/18 |
| | | | | | | 318/773 |

(Continued)

*Primary Examiner* — Benjamin L Osterhout
(74) *Attorney, Agent, or Firm* — Dorris & Manning, P.A.

(57) ABSTRACT

A washing machine appliance and a shifter assembly therefor are generally provided. The shifter assembly may include an agitator drive shaft, a motor, a wash basket drive shaft, and a clutch. The agitator drive shaft may extend along a drive axis. The motor may be operably connected to the agitator drive shaft to drive rotation thereof. The motor may include a rotor fixed to the agitator drive shaft and a stator rotationally fixed at a position radially inward from the rotor. The wash basket drive shaft may be rotationally independent from the agitator drive shaft. The clutch may be slidably disposed on the wash basket drive shaft. The clutch may be movable between an engaged position and a disengaged position. The disengaged position may provide the clutch in rotationally fixed attachment on the stator. The engaged position may provide the clutch away from the stator and rotatable relative thereto.

16 Claims, 8 Drawing Sheets

(56) References Cited

U.S. PATENT DOCUMENTS

| | | | |
|---|---|---|---|
| 2001/0030482 A1* | 10/2001 | Ley | H02K 17/06 310/184 |
| 2005/0016226 A1* | 1/2005 | Okazaki | D06F 33/02 68/12.04 |
| 2005/0223754 A1* | 10/2005 | Choi | D06F 37/304 68/3 R |
| 2008/0282479 A1* | 11/2008 | Darby | D06F 39/003 8/159 |
| 2009/0145173 A1* | 6/2009 | Seagar | D06F 37/40 68/12.16 |
| 2010/0050702 A1* | 3/2010 | Kim | D06F 37/304 68/23 R |
| 2014/0165661 A1* | 6/2014 | Chupka | D06F 33/06 68/133 |

* cited by examiner

WASHING MACHINE APPLIANCE AND SHIFTER ASSEMBLY THEREFOR

FIELD OF THE INVENTION

The present subject matter relates generally washing machine appliances, and more particularly to a shifter assembly for shifting between certain modes of operation in a washing machine appliance.

BACKGROUND OF THE INVENTION

Washing machines are typically equipped to operate with one or more modes or cycles such as wash, rinse, and spin modes. During a wash or rinse mode for a vertical drive axis washing machine, the laundry articles are usually submerged at least partially within a wash or rinse fluid while an agitator is used to impart motion to the laundry articles that are contained within a wash basket. A wash tub contains the fluid, agitator, and wash basket.

During a wash or rinse mode, the wash basket of some washing machines remains stationary while the agitator rotates to impart movement to the laundry articles. During a spin mode, typically both the agitator and the wash basket are rotated so as to subject the articles in the laundry to centrifugal forces. These forces cause water and other fluids to be wrung from the clothes. These liquids can exit the wash basket through holes positioned along the outer wall of the wash basket for subsequent removal from the wash tub.

For operation of a washing machine appliance between the wash, rinse, and spin modes, it is desirable to independently control the movement of the agitator and wash basket. More specifically, during the wash and rinse modes, the wash basket may be held stationary while the agitator is rotated so as to impart movement to the laundry articles. During the spin mode, however, rotation of the wash basket is required to wring liquid from the articles as set forth above.

In order to control the rotation of the agitator and wash basket, a vertical drive axis washing machine can be equipped with e.g., a clutch for engaging and disengaging the wash basket from a motor that can be used to rotate the agitator and/or wash basket. As the washing machine executes a cleaning process, the clutch is operated at certain times in order to provide the desired movement of the agitator and wash basket during one or more wash, rinse, and/or spin cycles.

Conventionally, movement of the clutch has typically been performed and controlled by complex linkages having multiple parts. These parts must be collected and assembled during manufacture of the appliance. Moreover, relatively large motors, such as direct drive motors, have been required to rotate the wash basket and agitator. These systems may be difficult to assemble, expensive, inefficient, and bulky. Furthermore, a relatively complex multi-speed motor may be required, e.g., to rotate the agitator or wash basket at different speeds.

Accordingly, a washing machine appliance that can shift between various modes or cycles of operation would be useful. More particularly, a compact efficient assembly for alternately rotating the agitator and/or wash basket for various modes of operation would be beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a washing machine appliance is provided. The washing machine appliance may include a wash tub for the receipt of laundry articles and fluid for cleaning, a wash basket received into the wash tub to retain the laundry articles, an agitator, an agitator drive shaft, a motor, a wash basket drive shaft, and a clutch. The agitator may be rotatably positioned in the wash basket to impart motion to the laundry articles within the wash basket. The agitator drive shaft may extend from the agitator to rotate therewith. The motor may be operably connected to the agitator drive shaft to drive rotation of the agitator. The motor may include a rotor fixed to the agitator drive shaft and a stator rotationally fixed at a position radially inward from the rotor. The wash basket drive shaft may extend from the wash basket to rotate therewith. The clutch may be slidably disposed on the wash basket drive shaft. The clutch may be movable between an engaged position and a disengaged position. The disengaged position may provide the clutch in rotationally fixed attachment on the stator. The engaged position may provide the clutch away from the stator and rotatable relative thereto.

In another aspect of the present disclosure, a shifter assembly is provided. The shifter assembly may include an agitator drive shaft, a motor, a wash basket drive shaft, and a clutch. The agitator drive shaft may extend along a drive axis. The motor may be operably connected to the agitator drive shaft to drive rotation thereof. The motor may include a rotor fixed to the agitator drive shaft and a stator rotationally fixed at a position radially inward from the rotor. The wash basket drive shaft may be rotationally independent from the agitator drive shaft. The clutch may be slidably disposed on the wash basket drive shaft. The clutch may be movable between an engaged position and a disengaged position. The disengaged position may provide the clutch in rotationally fixed attachment on the stator. The engaged position may provide the clutch away from the stator and rotatable relative thereto.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure may provide a washing machine appliance that includes a motor and compact shifter assembly for alternately rotating an agitator and/or wash basket of the washing machine appliance. A sliding clutch may be provided to lock the wash basket during certain conditions. Locking the wash basket may ensure that the wash basket is not permitted to rotate with the agitator. For instance, the motor may have a fixed stator that the clutch may selectively engage in direct contact.

Figure 1:
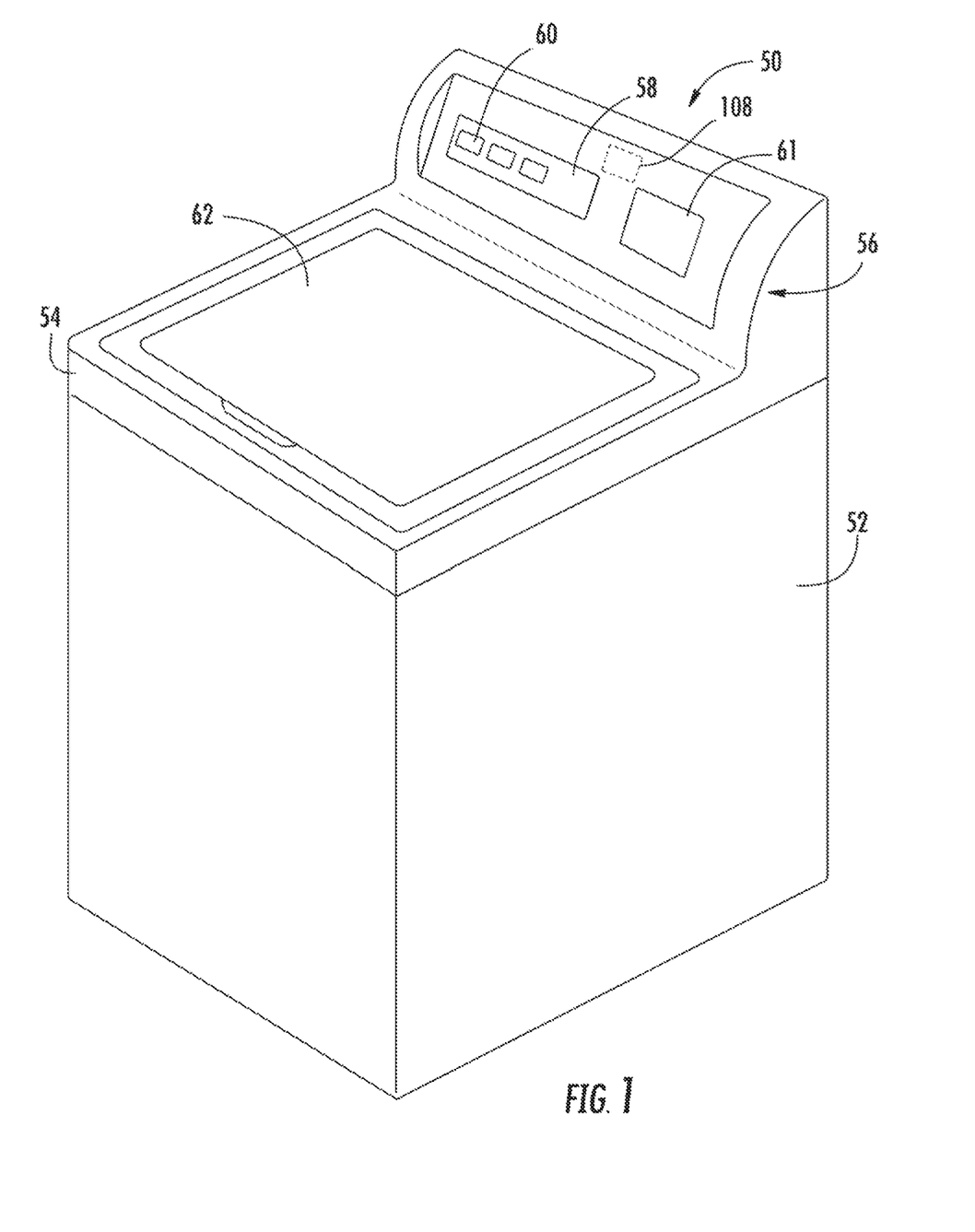
FIG. 1 provides a perspective view of a washing machine appliance according to example embodiments of the present disclosure.
Figure 2:
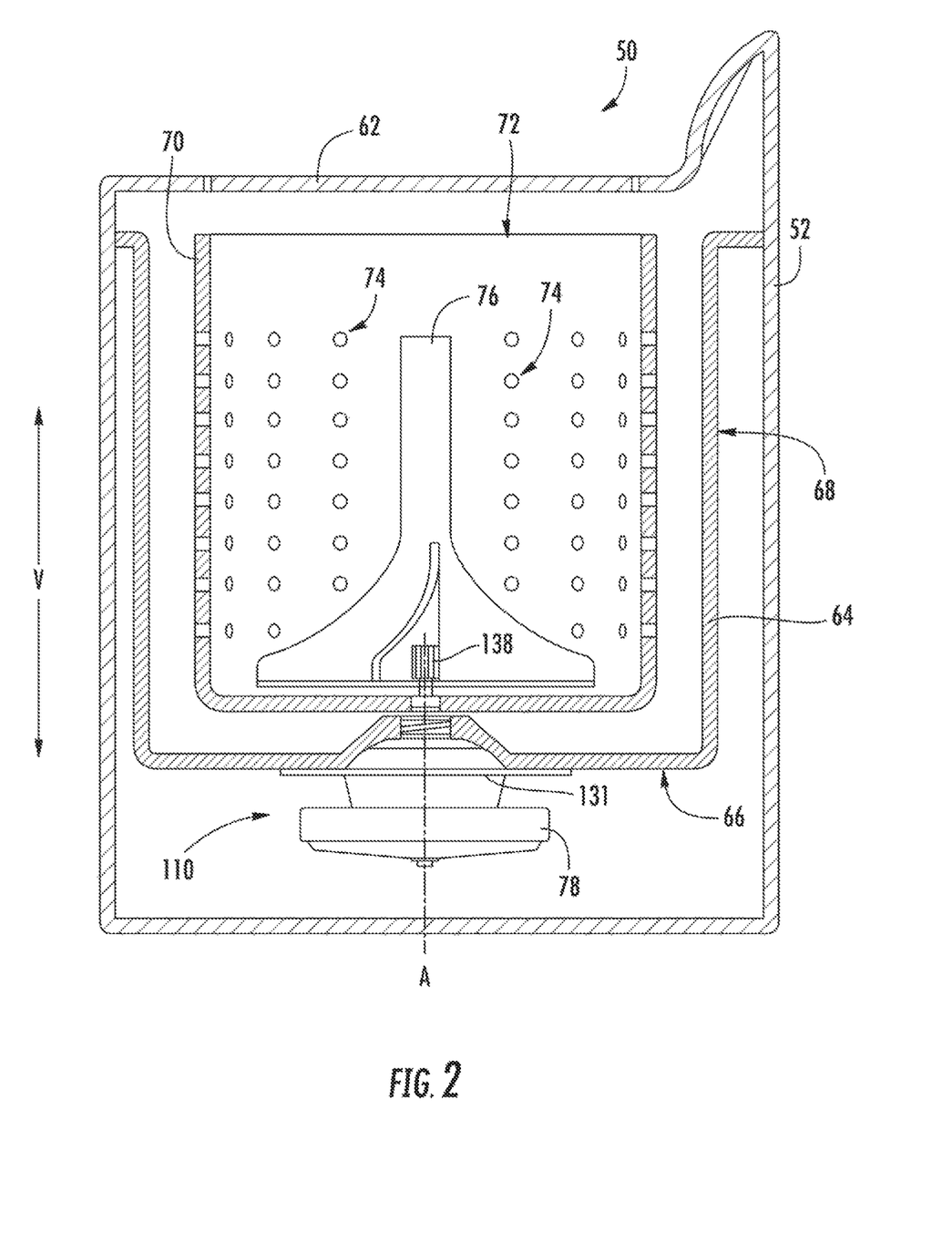
FIG. 2 provides a side cross-sectional view of the example washing machine appliance of FIG. 1.
Figure 3:
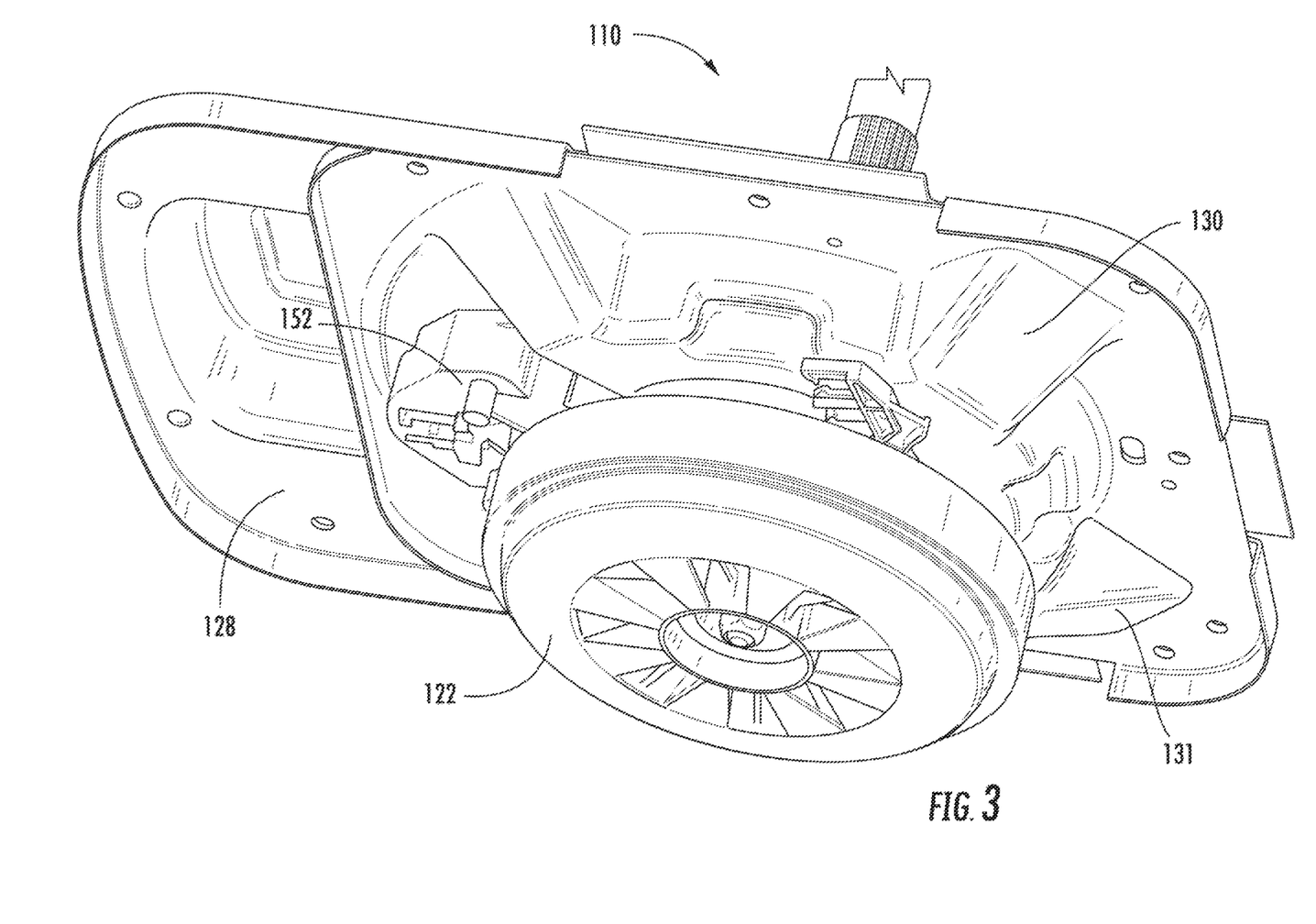
FIG. 3 provides a bottom perspective view of an example drive assembly for the example washing machine appliance of FIG. 1.

Turning now to the figures, FIG. 1 provides a perspective view of a washing machine appliance 50 according to example embodiments of the present disclosure. FIG. 2 provides a side cross-sectional view of the example washing machine appliance 50 of FIG. 1. As shown, washing machine 50 including a cabinet 52 and a top cover 54. FIG. 2 is a side cross-sectional view of the example embodiment of FIG. 1. A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in some embodiments, a display 61 indicates selected features, a countdown timer, and/or other items of interest to machine users.

A door or lid 62 is mounted to cover 54 and is rotatable about a hinge (not shown) between an open position (not shown) facilitating access to wash tub 64 located within cabinet 52, and a closed position (shown in FIG. 1) forming an enclosure over wash tub 64. Wash tub 64 includes a bottom wall 66 and a sidewall 68. A basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a washload therein. Basket 70 includes a plurality of perforations 74 therein to facilitate fluid communication between an interior of basket 70 and wash tub 64.

An agitation element or agitator 76, such as a vane agitator, impeller, auger, or oscillatory basket mechanism, or some combination thereof is disposed in basket 70 to impart an oscillatory motion to articles and liquid in basket 70. In different embodiments, agitator 76 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitator 76 and wash basket 70 are oriented to rotate about a drive axis A (which is substantially parallel to vertical direction V). Basket 70 and agitator 76 are driven by a drive assembly 110, including permanent magnet synchronous motor 78 and shifter assembly, which operates to turn or rotate agitator 76 and/or basket 70 with tub 64 as will be described in detail below.

Operation of washing machine appliance 50 is controlled by a controller or processing device 108 (FIG. 1) that is connected (e.g., electrically coupled) to control panel 58 for user manipulation to select washing machine cycles and features. In response to user manipulation of control panel 58, controller 108 operates the various components of washing machine appliance 50 to execute selected machine cycles and features.

Controller 108 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 108 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50, including drive assembly 110, may be in communication with controller 108 via one or more signal lines or shared communication busses.

In illustrative embodiments, laundry items are loaded into basket 70, and washing operation is initiated through operator manipulation of control input selectors 60 (shown in FIG. 1). Wash tub 64 is filled with water and mixed with detergent to form a wash fluid. The contents of basket 70 are agitated with agitator 76 for cleansing of laundry items in basket 70. More specifically, agitator 76 is moved back and forth in an oscillatory back and forth motion by drive assembly 110. In some embodiments, agitator 76 is rotated clockwise a specified amount about the drive axis A of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitator 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the cleaning process selected by a user. In certain embodiments, basket 70 is held in a fixed position during portions of the wash and rinse cycles while agitator 76 is oscillated as described.

One or more spin cycles may also be used as part of the cleaning process. In particular, a spin cycle may be applied after the wash cycle and/or after the rinse cycle in order to wring wash fluid from the articles being washed. During a spin cycle, basket 70 is rotated at relatively high speeds to help wring fluid from the laundry articles through holes 74.

Turning now to FIGS. 2 through 6, an example drive assembly 110 is provided. Drive assembly 110 generally includes a motor 78 operably attached to an agitator drive shaft 124 and a wash basket drive shaft 126. When assembled, agitator drive shaft 124 extends from (e.g., in fixed attachment to) agitator 76 (FIG. 2) at a first end 242. During operations, agitator drive shaft 124 may thus rotate with agitator 76. Wash basket drive shaft 126 extends from (e.g., in fixed attachment to) wash basket 70 (FIG. 2). During operations, wash basket drive shaft 126 may thus rotate with wash basket 70. In example embodiments, one or both of wash basket drive shaft 126 and agitator drive shaft 124 extend along the drive axis A. In turn, wash basket drive shaft 126 may be concentric with agitator drive shaft 124.

Figure 4:
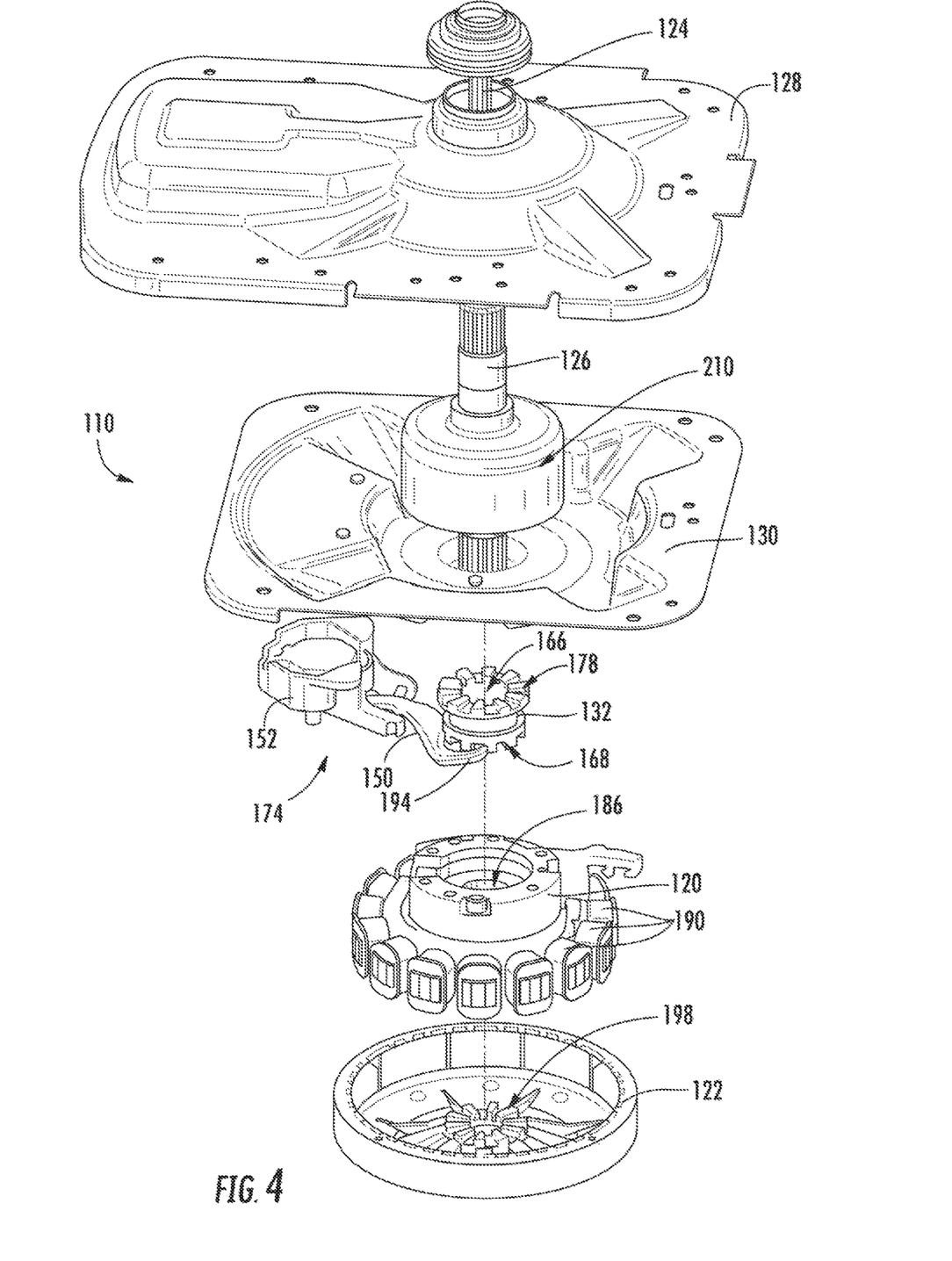
FIG. 4 provides an exploded perspective view of the example drive assembly of FIG. 3.

As shown, for example in FIG. 4, motor 78, includes a stator 120 and a rotor 122. When energized with the appropriate power, rotor 122 is caused to rotate while stator 120 remains fixed. Rotor 122 is attached to one end (e.g., a second end) of agitator drive shaft 124 through coupling 142. Agitator drive shaft 124 extends along drive axis A (e.g., vertically) and is connected with a coupling 138 (FIG. 2) at the end opposite of coupling 142. Coupling 138 attaches agitator drive shaft 124 to agitator 76 (FIG. 2).

Returning to FIGS. 2 through 6, stator 120 is attached to a stationary housing 131 formed by a lower clam shell 130 attached to an upper clam shell 128. The bottom wall 66 of wash tub 64 is attached to upper clam shell 128 of stationary housing 131. Stationary housing 131 forms a cavity 170 that may enclose, e.g., a gear assembly.

Wash basket drive shaft 126 may be concentric with agitator drive shaft 124. For example, wash basket drive shaft 126 is connected with wash basket 70 at a threaded portion 172. Agitator drive shaft 124 can rotate within wash basket drive shaft 126 even if wash basket drive shaft 126 (and, therefore, wash basket 70) is held in a fixed position. Wash basket drive shaft 126 can also rotate within upper and lower clam shells 128 and 130 of stationary housing 131, which is mounted on wash basket drive shaft 126 using a pair of bearings 136. The position of wash basket drive shaft 126 can be fixed to hold wash basket 70 stationary while agitator 76 is oscillated during e.g., a wash or rinse cycle. Alternatively wash basket drive shaft 126 and, therefore, wash basket 70 can also be rotated with agitator 76 during a spin cycle.

In some embodiments, a gear assembly, such as an epicyclical or planetary gear assembly 210 may be provided between, for example, drive shaft 124. For example, planetary gear assembly 210 may operably connect the first and second ends 244, 246 of agitator drive shaft 124. In some such embodiments, agitator drive shaft 124 comprises a discrete first member 246 and second member 248. First member 246 of agitator drive shaft 124 extends along the drive axis A (e.g., vertically) from the first end 242 of agitator drive shaft 124 to planetary gear assembly 210. Second member 248 of agitator drive shaft 124 extends along the drive axis A (e.g., vertically) from the second end 244 of agitator drive shaft 124 to planetary gear assembly 210.

As a further example, planetary gear assembly 210 may operably connect the first and second ends 262, 264 of wash basket drive shaft 126. In some such embodiments, wash basket drive shaft 126 comprises a first member 266 and second member 268. First member 266 of wash basket drive shaft 126 extends along the drive axis A (e.g., vertically) from the first end 262 of wash basket drive shaft 126 to the planetary gear assembly 210. Second member 268 of wash basket drive shaft 126 extends along the drive axis A (e.g., vertically) from the second end, 264 of wash basket drive shaft 126 to planetary gear assembly 210.

As shown, planetary gear assembly 210 includes a housing 212 enclosing a meshed sun gear 214 and one or more planet gears 216. Planet gears 216 may be rotatably attached on a carrier plate 219. In the illustrated embodiments, carrier plate 219 is fixed to the first member 246 of agitator drive shaft 124. Thus, carrier plate 219 and the first member 246 of agitator drive shaft 124 may operate to follow the revolution path of planet gears 216 about sun gear 214. Additionally or alternatively, sun gear 214 may be fixed to the second member 248 of agitator drive shaft 124. For instance, sun gear 214 may be formed on a portion of the second member 248 that is disposed within housing 212.

In some embodiments, a housing wall 222 joins first and second members 266, 268 of wash basket drive shaft 126, e.g., as a part of drive shaft 126. In other words, planet gears 216 and sun gear 214 may be mounted within housing 212 between first and second members 266, 268 of wash basket drive shaft 126. Moreover, a ring gear 218 may be mounted within housing 212. For instance, ring gear 218 may be in fixed or integral attachment with second member 268. Additionally or alternatively, ring gear 219 may be in fixed or integral attachment to an internal surface of housing wall 222. When assembled, ring gear 218 may be meshed with planet gears 216, e.g., radially outward therefrom. During certain cycles (e.g., a wash cycle), clutch 132 is in a downward, disengaged position such that rotation of sun gear 248 (e.g., by rotor 122) drives planet gears 216, which rotate within ring gear 218. Ring gear 218 may be rotationally fixed with the drive shaft 126 such that wash basket 70 (FIG. 2) does not rotate. During other cycles (e.g., a spin cycle), clutch 132 is in an upward, engaged position such that wash basket drive shaft 126 and ring gear 218 rotate, while agitator drive shaft 124 remains stationary.

Advantageously, planetary gear assembly 210 may increase the rotational force output from rotor 122 during a wash cycle, thus requiring a relatively small and/or underpowered motor (in comparison to a motor requirements for a direct-drive motor). Moreover, planetary gear assembly 210 may advantageously allow for variable rotation of agitator 76 and drive shaft with a single speed motor.

Figure 8:
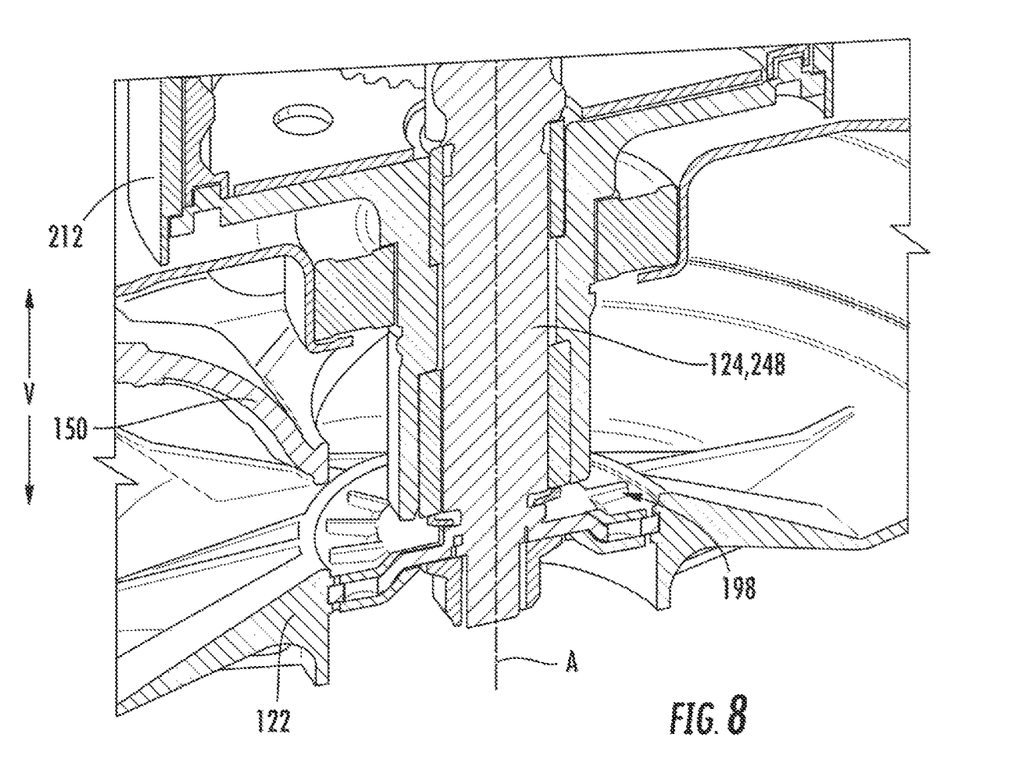
FIG. 8 provides a perspective cross-sectional view of a portion of an example drive assembly, wherein the clutch and the stator have been removed.

A clutch 132 is provided within drive assembly 110. Specifically, clutch 132 is slidably disposed about the drive axis A. As shown, clutch 132 extends along the drive axis A (e.g., vertically) from a top portion 232 to a bottom portion 234. Clutch 132 further includes a first coupling tine or plurality of teeth 168 along bottom portion 234 and a second coupling tine or plurality of teeth 178 along the opposing top portion 232. Teeth 168 are positioned to selectively mesh with a plurality of teeth 198 (e.g., FIGS. 4 and 8) on rotor 122 (e.g., when clutch 132 is an engaged position so as to rotate wash basket 70). Conversely, teeth 178 are positioned to selectively mesh with a plurality of teeth 182 on stator 120 (e.g., when clutch 132 is in a disengaged position so that wash basket 70 is precluded from rotating while agitator 76 is rotated).

Figure 5:
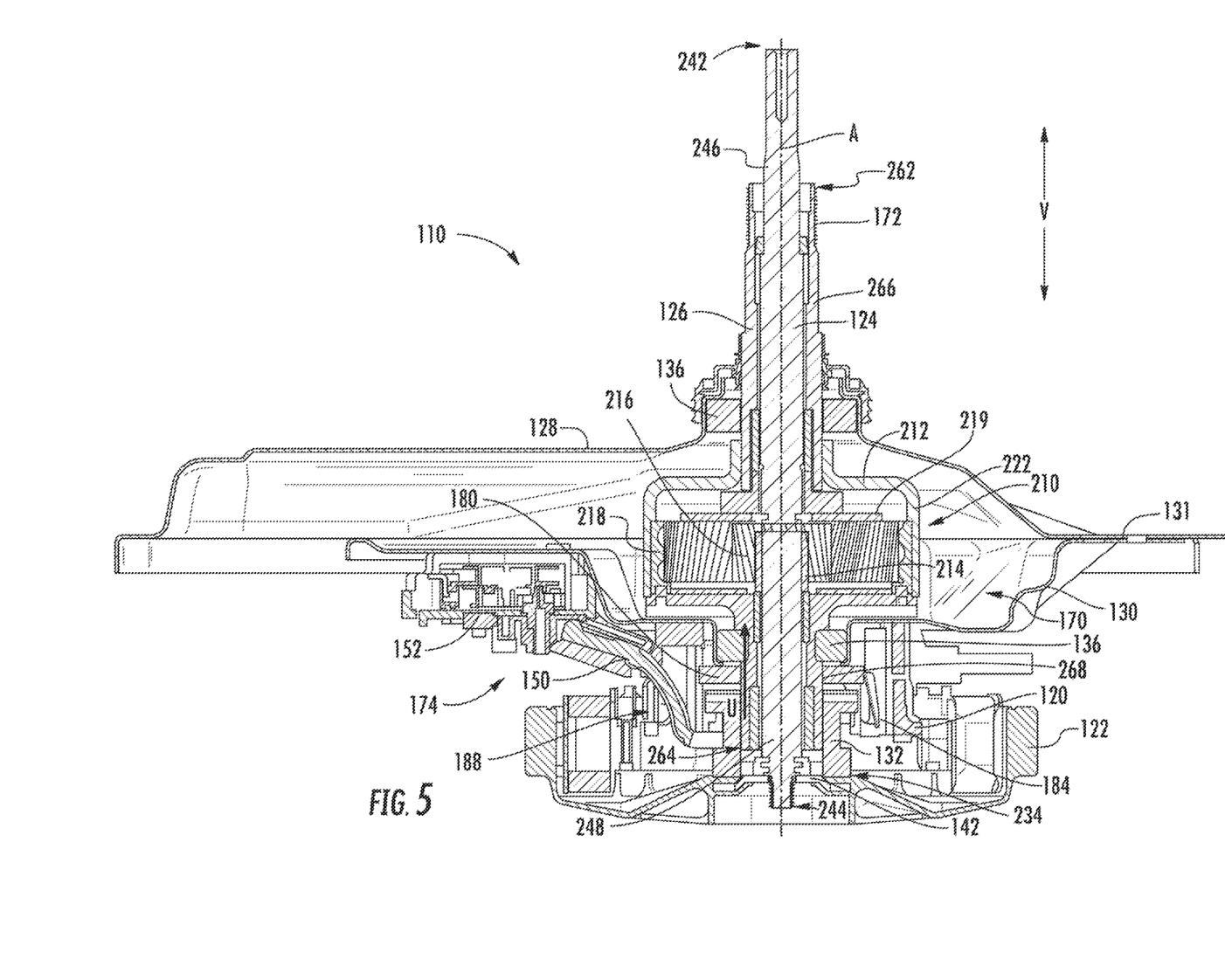
FIG. 5 provides a side cross-sectional view of the example drive assembly of FIG. 3, wherein the drive assembly in a downward engaged position.
Figure 6:
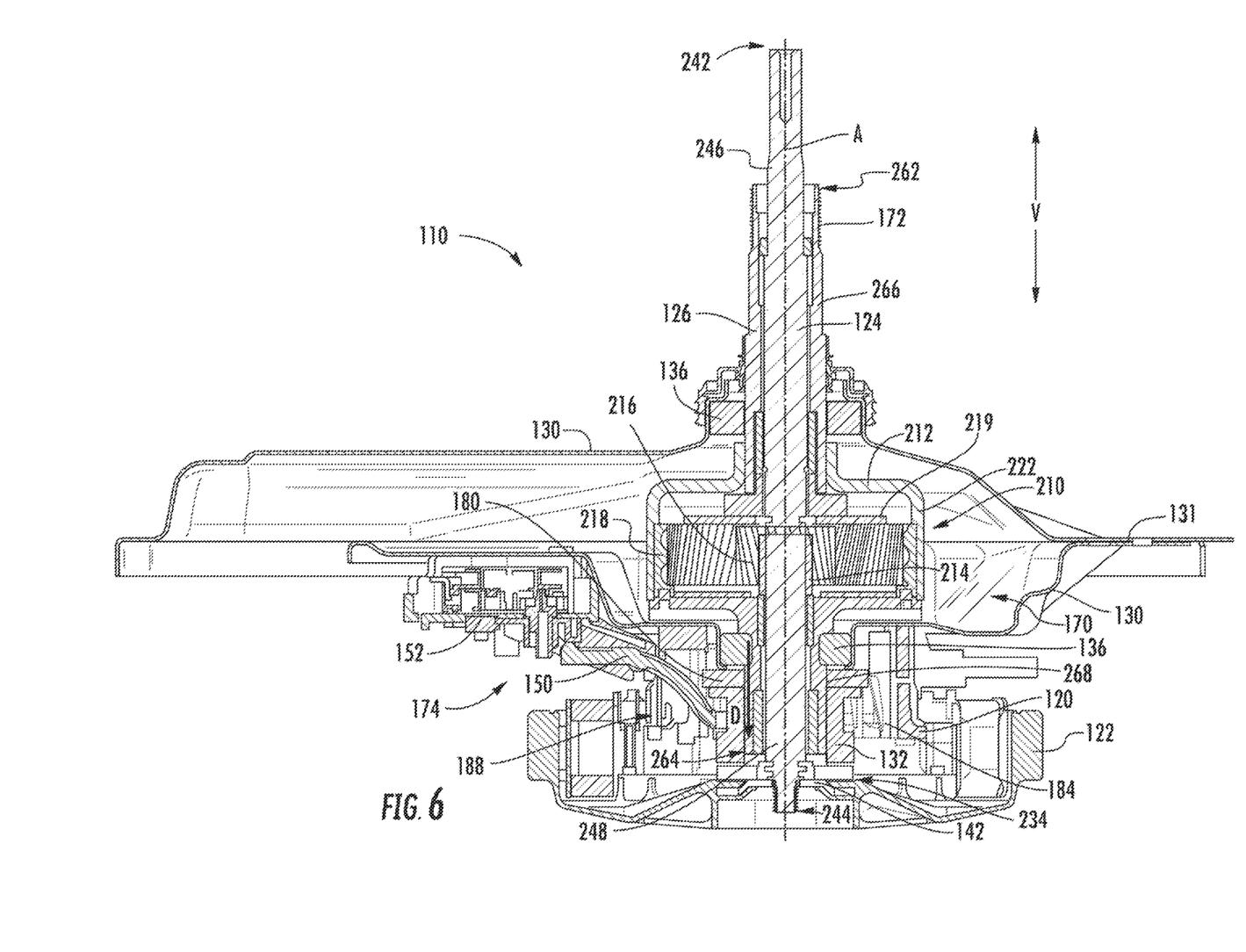
FIG. 6 provides a side cross-sectional view of the example drive assembly of FIG. 3, wherein the drive assembly in an upward disengaged position.
Figure 9:
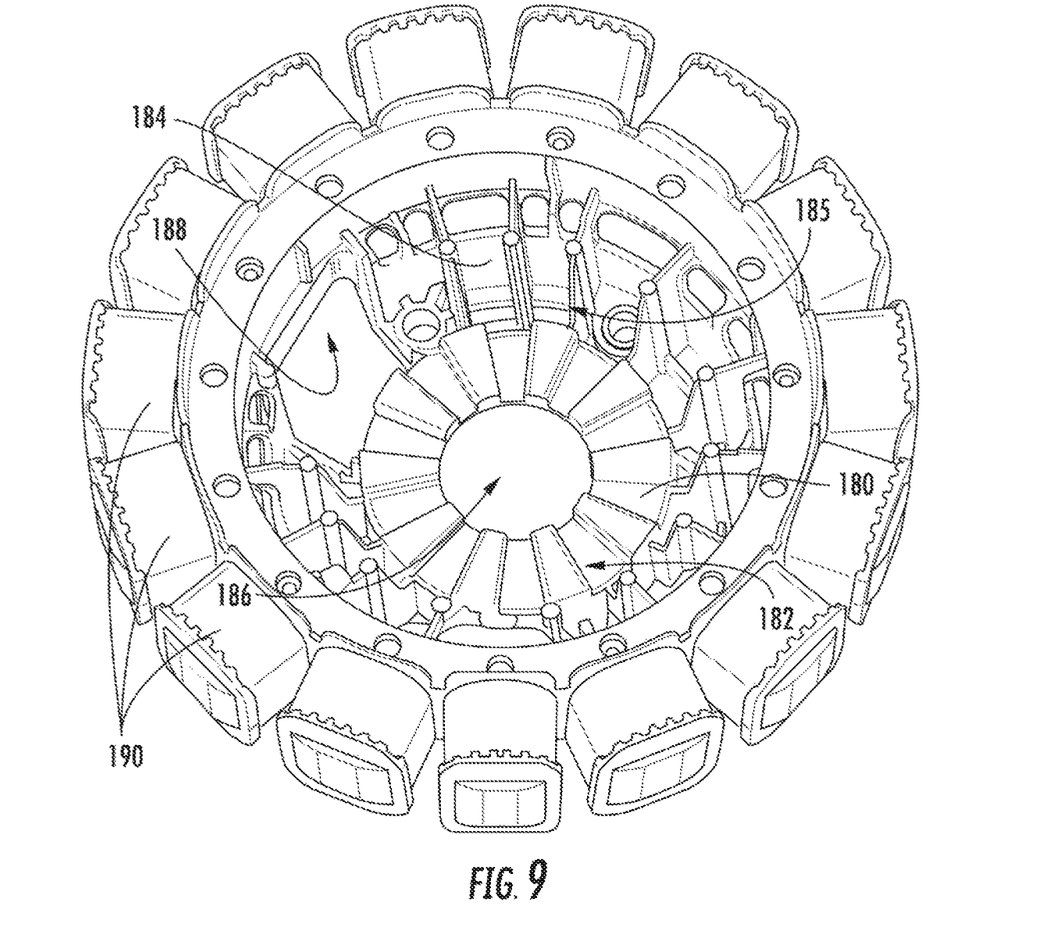
FIG. 9 provides a bottom perspective view of the stator of the example drive assembly of FIG. 3.

Turning specifically to FIGS. 5 and 6, in order to selectively control the rotation of wash basket 70 (FIG. 2), clutch 132 is used to engage and disengage wash basket drive shaft 126 from rotor 122. When assembled, clutch 132 may slide along wash basket drive shaft 126 (e.g., at the second member 268). In FIG. 5, clutch 132 is shown in a downward, engaged position in which wash basket drive shaft 126 is engaged with rotor 122 such that wash basket 70 and agitator 76 (FIG. 2) are rotated simultaneously by rotor 122. In FIG. 6, clutch 132 is shown in an upward, disengaged position in which wash basket drive shaft 126 is disengaged from rotor 122 such that the rotation of wash basket 70 is prevented while agitator 76 is rotated (e.g., during wash and rinse cycles). In this position, clutch 132 is engaged with stationary housing 131, which is attached to wash tub 64 (FIG. 2). Specifically, clutch 132 contacts stator 120 through teeth 182 (FIG. 9). Stator 182 is attached to stationary housing 131 (e.g., via mechanical fasteners, such as screws), which is further attached to tub bottom 66. Generally, clutch 132 can be shifted downward (arrow D in FIG. 6) to the engaged position shown in FIG. 5 and upward (arrow U in FIG. 5) to the disengaged position shown in FIG. 6.

Figure 7:
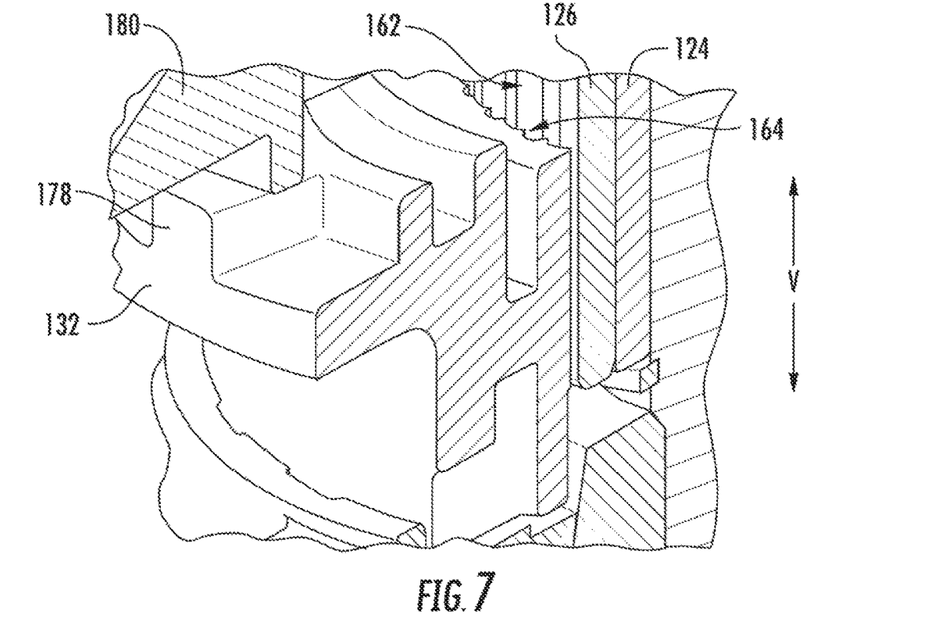
FIG. 7 is a magnified, partial cross-sectional view of a portion of the example drive assembly of FIG. 3.

As shown in FIG. 7, the outside surface of wash basket drive shaft 126 includes a first plurality of spline teeth 162 oriented along the vertical direction V and positioned circumferentially about wash basket drive shaft 126 (e.g., at the second member 268). Clutch 132 defines a central opening 166 along drive axis A (FIG. 4) into which the wash basket drive shaft 126 is slidably received. Clutch 132 defines a second plurality of spline teeth 164 that mesh with spline teeth 162. As shown, teeth 162 and 164 are positioned on opposing sides of clutch 132 along vertical direction V. Accordingly, clutch 132 can shift along wash basket drive shaft 126 in vertical direction V while, at the same time, the rotation of clutch 132 will cause wash basket drive shaft 126 to also rotate.

Turning to FIG. 9, stator 120 may be an integral unitary member. Specifically, an upper wall 180 may be formed integrally with a sidewall 184 to define an internal stator cavity 185. A central stator opening 186 may be defined along the drive axis A, e.g., through upper wall 180. In turn, upper wall 180 and sidewall 184 may be formed as a continuous piece of material (e.g., with plastic) about central opening 186 and drive axis A. In some embodiments, the plurality of teeth 182 of the stator 120 may be integrally formed on upper wall 180. As shown, each of the plurality of teeth 182 is disposed about the drive axis A.

In additional or alternative embodiments, multiple magnetic windings 190 are attached to stator 120. Each magnetic winding 190 may be formed from insulated conductive wire. When assembled, the magnetic windings 190 may be circumferentially positioned about drive axis A and/or radially outward from sidewall 184, e.g., to electromagnetically engage and drive rotation of rotor 122. In some embodiments, magnetic windings 190 are positioned below upper wall 180 and at least a portion of sidewall 184. Advantageously, the overall diameter of stator 120 and windings 190 may thus be reduced. Furthermore, a relatively small clearance may be required between stator 120 and rotor 122 (e.g., in a radial direction relative to drive axis A).

As shown in FIGS. 4 through 8, drive assembly 110 includes a clutch positioning assembly 174 to selectively force clutch 132 to and/or from the disengaged position. Some embodiments include a yoke 150 having one or more arms 194 (e.g., a pair of arms) positioned in contact with clutch 132 to selectively force clutch 132 into the disengaged position. A lift motor 152 may be operably coupled to yoke 150, e.g., to pivot yoke 150 (and thereby move clutch 132) upward and downward. When assembled, yoke 150 may extend from lift motor 152 to clutch 132. Specifically, yoke 150 may extend through a sidewall opening 188 defined in stator 120. Lift motor 152 may be mounted at a position above stator 120 (e.g., above upper wall 180 of stator 120). Specifically, lift motor 152 may be mounted (e.g., in fixed attachment) to lower clam shell 130. Thus, yoke 150 may extend from a position above stator 120 to a position below the plurality of teeth 182 of stator 120.

During use, yoke 150 with arms 194 can be used to provide a force to push (i.e., lift) clutch 132 in the vertical direction V along drive axis A. The force provided by yoke 150 causes the second plurality of teeth 178 to mesh with teeth 182 of stator when assembly 174 is operated to move clutch 132 from the engaged position to the disengaged position. In addition, yoke 150 may be formed as an elastically flexible member. If teeth 178 and teeth 182 do not immediately line up during use, yoke 150 may deflect until teeth 178 and teeth 182 may be biased into alignment and direct meshed engagement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
    a wash tub for the receipt of laundry articles and fluid for cleaning;
    a wash basket received into the wash tub to retain the laundry articles;
    an agitator rotatably positioned in the wash basket to impart motion to the laundry articles within the wash basket;
    an agitator drive shaft extending from the agitator to rotate therewith;
    a motor operably connected to the agitator drive shaft to drive rotation of the agitator, the motor comprising a rotor fixed to the agitator drive shaft and a stator rotationally fixed at a position radially inward from the rotor;
    a wash basket drive shaft extending from the wash basket to rotate therewith; and
    a clutch slidably disposed on the wash basket drive shaft, the clutch being movable between an engaged position and a disengaged position, the disengaged position providing the clutch in rotationally fixed attachment on the stator, and the engaged position providing the clutch away from the stator and rotatable relative thereto,
    wherein the stator comprises an upper wall and a sidewall defining an internal stator cavity, the upper wall having a plurality of teeth disposed about a drive axis to contact the clutch in the disengaged position, the stator further comprising a plurality of windings positioned below the upper wall.

2. The washing machine appliance of claim 1, wherein the clutch extends in a drive axis from a top portion to a bottom portion, and wherein the bottom portion includes a coupling tine to rotationally fix the clutch on the rotor in the engaged position.

3. The washing machine appliance of claim 1, further comprising a yoke having one or more arms positioned in contact with the clutch to selectively force the clutch into the disengaged position.

4. The washing machine appliance of claim 1, wherein the agitator drive shaft extends along a drive axis from a first end to a second end, wherein the agitator drive shaft comprises
- a first member extending along the drive axis from the agitator at the first end,
- a planetary gear assembly operably connected to the first member, and
- a second member operably connected to the planetary gear assembly, the second member extending along the drive axis from the second end to the planetary gear assembly.

5. The washing machine appliance of claim 1 1, wherein the stator is an integral unitary member.

6. The washing machine appliance of claim 1, further comprising a stationary housing disposed about the agitator drive shaft, wherein the stator is fixed to the stationary housing.

7. The washing machine appliance of claim 1, wherein the wash basket drive shaft is concentric with the agitator drive shaft.

8. The washing machine appliance of claim 1, wherein the wash basket drive shaft includes a first plurality of spline teeth positioned circumferentially about the wash basket drive shaft, and wherein the clutch includes a central opening into which the wash basket drive shaft is slidably received, the clutch also includes a second plurality of spline teeth configured for receipt of the first plurality of spline teeth of the wash basket drive shaft.

9. A shifter assembly for a washing machine appliance, the shifter assembly comprising:
- an agitator drive shaft extending along a drive axis;
- a motor operably connected to the agitator drive shaft to drive rotation thereof, the motor comprising a rotor fixed to the agitator drive shaft and a stator rotationally fixed at a position radially inward from the rotor;
- a wash basket drive shaft rotationally independent from the agitator drive shaft; and
- a clutch slidably disposed on the wash basket drive shaft, the clutch being movable between an engaged position and a disengaged position, the disengaged position providing the clutch in rotationally fixed attachment on the stator, and the engaged position providing the clutch away from the stator and rotatable relative thereto, wherein the stator comprises an upper wall and a sidewall defining, an internal stator cavity, the upper wall having a plurality of teeth disposed about a drive axis to contact the clutch in the disengaged position, the stator further comprising a plurality of windings positioned below the upper wall.

10. The shifter assembly of claim 9, wherein the clutch extends in a drive axis from a top portion to a bottom portion, and wherein the bottom portion includes a coupling tine to rotationally fix the clutch on the rotor in the engaged position.

11. The shifter assembly of claim 9, further comprising a yoke having one or more arms positioned in contact with the clutch to selectively force the clutch into the disengaged position.

12. The shifter assembly of claim 9, wherein the agitator drive shaft extends along the drive axis from a first end to a second end, wherein the agitator drive shaft comprises
- a first member extending along the drive axis from the agitator at the first end,
- a planetary gear assembly operably connected to the first member, and
- a second member operably connected to the planetary gear assembly,the second member extending along the drive axis from the second end to the planetary gear assembly.

13. The shifter assembly of claim 9, wherein the stator is an integral unitary member.

14. The shifter assembly of claim 9, further comprising a stationary housing disposed about the agitator drive shaft, wherein the stator is fixed to the stationary housing.

15. The shifter assembly of claim 9, wherein the wash basket drive shaft is concentric with the agitator drive shaft.

16. The shifter assembly of claim 9, wherein the wash basket drive shaft includes a first plurality of spline teeth positioned circumferentially about the wash basket drive shaft, and wherein the clutch includes a central opening into which the wash basket drive shaft is slidably received, the clutch also includes a second plurality of spline teeth configured for receipt of the first plurality of spline teeth of the wash basket drive shaft.

* * * * *